(12) United States Patent
Garotte et al.

(10) Patent No.: US 11,110,829 B2
(45) Date of Patent: Sep. 7, 2021

(54) PIVOTING SYSTEM, PIVOTING ASSEMBLY, PIVOTING MODULE AND SEAT COMPRISING THE PIVOTING SYSTEM

(71) Applicant: FAURECIA Sièges d'Automobile, Nanterre (FR)

(72) Inventors: Gérald Garotte, Bellou en Houlme (FR); Bertrand Touzet, Pollhagen (FR)

(73) Assignee: FAURECIA Sièges d'Automobile, Nanterre (FR)

( * ) Notice: Subject to any disclaimer, the term of this patent is extended or adjusted under 35 U.S.C. 154(b) by 0 days.

(21) Appl. No.: 17/011,102

(22) Filed: Sep. 3, 2020

(65) Prior Publication Data
US 2021/0061142 A1    Mar. 4, 2021

(30) Foreign Application Priority Data

Sep. 4, 2019 (FR) ..................................... 19 09742

(51) Int. Cl.
| | | |
|---|---|---|
| B60N 2/22 | (2006.01) |
| B60N 2/225 | (2006.01) |
| B60N 2/02 | (2006.01) |
| B60N 2/14 | (2006.01) |
| F16H 1/32 | (2006.01) |

(52) U.S. Cl.
CPC ......... *B60N 2/2252* (2013.01); *B60N 2/0232* (2013.01); *B60N 2/14* (2013.01); *F16H 1/32* (2013.01); *B60N 2002/0236* (2013.01); *F16H 2001/324* (2013.01)

(58) Field of Classification Search
CPC ..... F16H 1/32; F16H 1/46; F16H 1/48; F16H 2001/324; B60N 2002/0236; B60N 2/2252; B60N 2/0232; B60N 2/14

USPC ..................................................... 297/344.21
See application file for complete search history.

(56) References Cited

U.S. PATENT DOCUMENTS

| | | | |
|---|---|---|---|
| 4,407,544 A | 10/1983 | Baehring |
| 4,846,529 A | 7/1989 | Tulley |
| 5,209,637 A | 5/1993 | Reubeuze |
| (Continued) | | |

FOREIGN PATENT DOCUMENTS

| | | |
|---|---|---|
| EP | 0099549 A2 | 2/1984 |
| EP | 0505229 A1 | 9/1992 |
| (Continued) | | |

OTHER PUBLICATIONS

French Search Report for French Patent App. No. FR1909742 dated Apr. 24, 2020, BET200205 FR, 9 pages, (No English Translation Available).

*Primary Examiner* — Mark R Wendell
(74) *Attorney, Agent, or Firm* — Barnes & Thornburg LLP

(57) ABSTRACT

A pivoting system comprising a first hinge mechanism comprising a first frame and a second frame connected together by a first hypocycloidal gear, the first gear comprising a first eccentric cam, a first set of teeth, and a second set of teeth, the first eccentric cam having a first eccentricity, a second hinge mechanism comprising a first frame and a second frame connected together by a second hypocycloidal gear, the second gear comprising a second eccentric cam, a first set of teeth, and a second set of teeth, the second eccentric cam having a second eccentricity equal to the first eccentricity, a control shaft configured to drive the first eccentric cam and the second eccentric cam in rotation.

12 Claims, 9 Drawing Sheets

(56) References Cited

U.S. PATENT DOCUMENTS

| | | | | |
|---|---|---|---|---|
| 6,007,153 | A * | 12/1999 | Benoit | B60N 2/2358 |
| | | | | 297/363 |
| 6,164,723 | A * | 12/2000 | Ganot | B60N 2/2358 |
| | | | | 297/367 R |
| 7,644,989 | B2 | 1/2010 | Baloche Faurecia | |
| 7,753,450 | B2 * | 7/2010 | Eppert | B60N 2/2254 |
| | | | | 297/362 |
| 8,128,169 | B2 * | 3/2012 | Narita | B60N 2/0232 |
| | | | | 297/362 |
| 8,672,407 | B2 | 3/2014 | Leconte | |
| 9,085,248 | B2 * | 7/2015 | Nock | B60N 2/2358 |
| 9,205,765 | B2 * | 12/2015 | Kim | B60N 2/2252 |
| 10,071,657 | B2 | 9/2018 | Albert Reginold | |
| 2008/0203784 | A1 | 8/2008 | Eppert | |
| 2012/0025586 | A1 * | 2/2012 | Legras | B60N 2/2252 |
| | | | | 297/463.1 |
| 2016/0200222 | A1 | 7/2016 | Desquesne | |
| 2020/0101871 | A1 * | 4/2020 | Garotte | B60N 2/0232 |

FOREIGN PATENT DOCUMENTS

| | | |
|---|---|---|
| EP | 3113974 A1 | 1/2017 |
| FR | 2676690 A1 | 11/1992 |
| FR | 2883812 A1 | 10/2006 |
| FR | 2962944 A1 | 1/2012 |
| FR | 3006637 A1 | 12/2014 |
| FR | 3073460 A1 | 5/2019 |
| WO | 2015132215 A1 | 9/2015 |

* cited by examiner

PIVOTING SYSTEM, PIVOTING ASSEMBLY, PIVOTING MODULE AND SEAT COMPRISING THE PIVOTING SYSTEM

PRIORITY CLAIM

This application claims priority to French Application No. FR 19 09742, filed Sep. 4, 2019, which is expressly incorporated by reference herein.

BACKGROUND

The present disclosure relates to pivoting systems and to vehicle seats comprising such systems.

SUMMARY

According to the present disclosure, a pivoting system comprises:

a first hinge mechanism comprising a first frame and a second frame mounted so as to rotate relative to one another and connected together by a first hypocycloidal gear, the first gear comprising a first eccentric cam, a first set of teeth and a second set of teeth, the first set of teeth of the first hinge mechanism and the second set of teeth of the first hinge mechanism being circular and in mutual engagement, the first set of teeth of the first hinge mechanism being mechanically linked to the first frame of the first hinge mechanism and the second set of teeth of the first hinge mechanism being mechanically linked to the second frame of the first hinge mechanism, the first set of teeth of the first hinge mechanism being centered on a first axis and the second set of teeth of the first hinge mechanism being centered on a second axis, the first eccentric cam having a first eccentricity corresponding to the distance between the first axis and the second axis, a second hinge mechanism comprising a first frame and a second frame mounted so as to rotate relative to one another and connected together by a second hypocycloidal gear, the second gear comprising a second eccentric cam, a first set of teeth and a second set of teeth, the first set of teeth of the second hinge mechanism and the second set of teeth of the second hinge mechanism being circular and in mutual engagement, the first set of teeth of the second hinge mechanism being mechanically linked to the first frame of the second hinge mechanism and the second set of teeth of the second hinge mechanism being mechanically linked to the second frame of the second hinge mechanism, the first set of teeth of the second hinge mechanism being centered on a third axis and the second set of teeth of the second hinge mechanism being centered on a fourth axis, the second eccentric cam having a second eccentricity corresponding to the distance between the third axis and the fourth axis, the second frame of the first hinge mechanism being rigidly fixed to the first frame of the second hinge mechanism and the third axis being coaxial with the second axis, the first eccentricity being equal to the second eccentricity, such that the fourth axis is substantially coaxial with the first axis, and a control shaft comprising a first drive portion configured to drive the first eccentric cam in rotation and a second drive portion configured to drive the second eccentric cam in rotation.

In illustrative embodiments, the pivoting system can optionally have recourse to one or more of the following arrangements:

the control shaft has an eccentricity between the first drive portion and the second drive portion which is equal to the first eccentricity of the first hinge mechanism and to the second eccentricity of the second hinge mechanism;

the first set of teeth of the first hinge mechanism surrounds the second set of teeth of the first hinge mechanism, and the first set of teeth of the second hinge mechanism surrounds the second set of teeth of the second hinge mechanism;

the first eccentric cam comprises first radial play adjustment cams and the second eccentric cam comprises second radial play adjustment cams;

the first frame of the first hinge mechanism comprises a first collar, cylindrical, rotationally symmetrical and centered on the first axis, and the second frame of the first hinge mechanism comprises a second collar, cylindrical, rotationally symmetrical and centered on the second axis;

the first collar of the first hinge mechanism has a bore centered on the first axis, and the first eccentric cam has a guide surface guided in rotation about the first axis within the bore of the first collar of the first hinge mechanism;

the second collar of the first hinge mechanism has a bore centered on the second axis, and the first eccentric cam has a drive surface around which the bore of the second collar of the first hinge mechanism is guided in rotation on the second axis;

the first frame of the second hinge mechanism comprises a first collar, cylindrical, rotationally symmetrical, centered on the second axis, and the second frame of the second hinge mechanism comprises a second collar, cylindrical, rotationally symmetrical and centered on the first axis;

the first collar of the second hinge mechanism has a bore centered on the second axis, and the second eccentric cam has a guide surface guided in rotation about the second axis within the bore of the first collar of the second hinge mechanism;

the second collar of the second hinge mechanism has a bore centered on the first axis, and the second eccentric cam has a drive surface around which the bore of the second collar of the second hinge mechanism is guided in rotation on the first axis;

the first set of teeth of the first hinge mechanism has the same number of teeth as the first set of teeth of the second hinge mechanism, and the second set of teeth of the first hinge mechanism has the same number of teeth as the second set of teeth of the second hinge mechanism;

the first hinge mechanism is identical to the second hinge mechanism, but angularly offset by 180 degrees about the first axis.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

DETAILED DESCRIPTION

In the different figures, the same references designate identical or similar elements.

Figure 1:
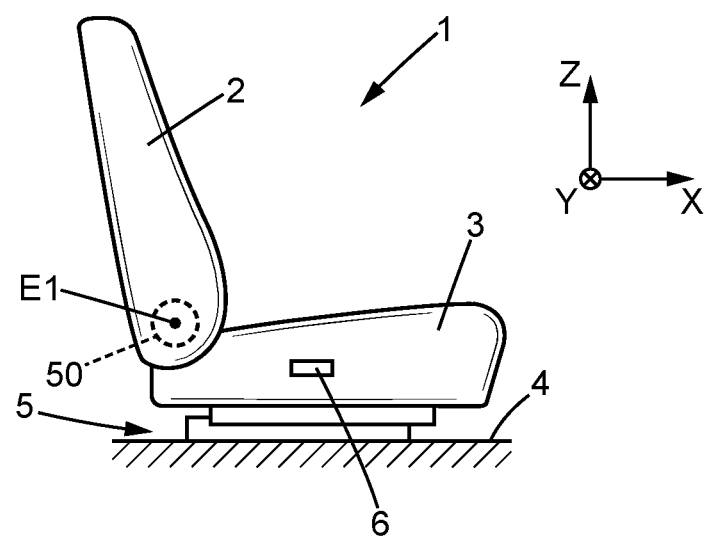
FIG. 1 is a schematic view of a vehicle seat equipped with a pivoting assembly according to the present disclosure for pivoting the backrest relative to the seating portion.

FIG. 1 represents a motor vehicle seat 1, the seat 1 comprising a backrest 2 mounted so as to pivot on a seating portion 3 about a first input axis E1, said seating portion being mounted on the floor 4 of the vehicle, for example by means of slide rails 5. The seat 1 is in particular a front seat of a motor vehicle.

As illustrated in FIG. 1, the first input axis E1 extends parallel to a transverse direction Y of the vehicle. The slide rails 5 extend substantially in a longitudinal direction X, perpendicular to the transverse direction Y. A vertical direction Z extends perpendicularly to the longitudinal direction X and to the transverse direction Y.

Figure 5:
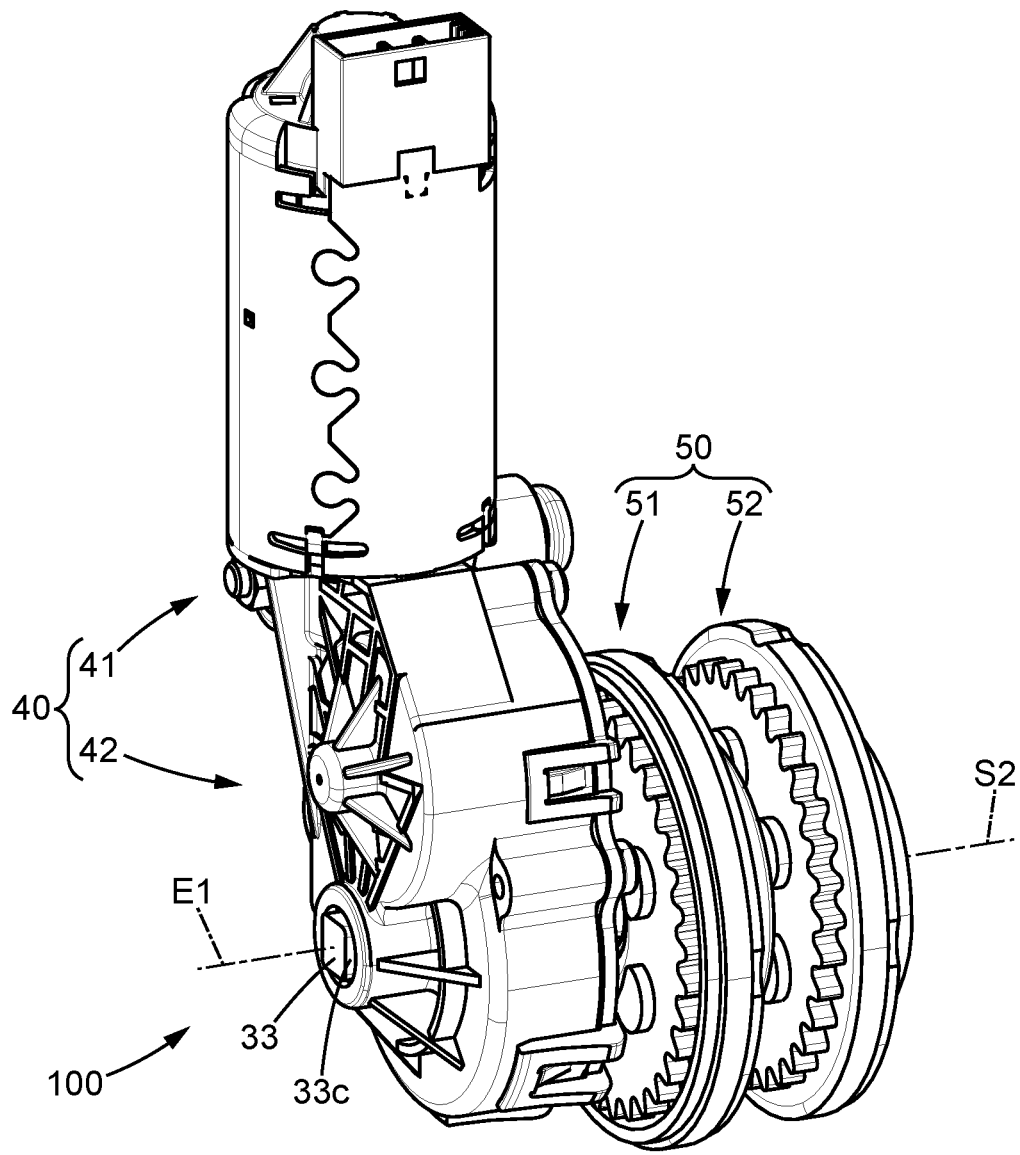
FIG. 5 is a perspective view of the pivoting assembly which can be fitted to the seat of FIG. 1 or the seats of FIGS. 2 to 4, in one embodiment of the present disclosure, the pivoting assembly comprising a pivoting system and a geared motor.
Figure 6:
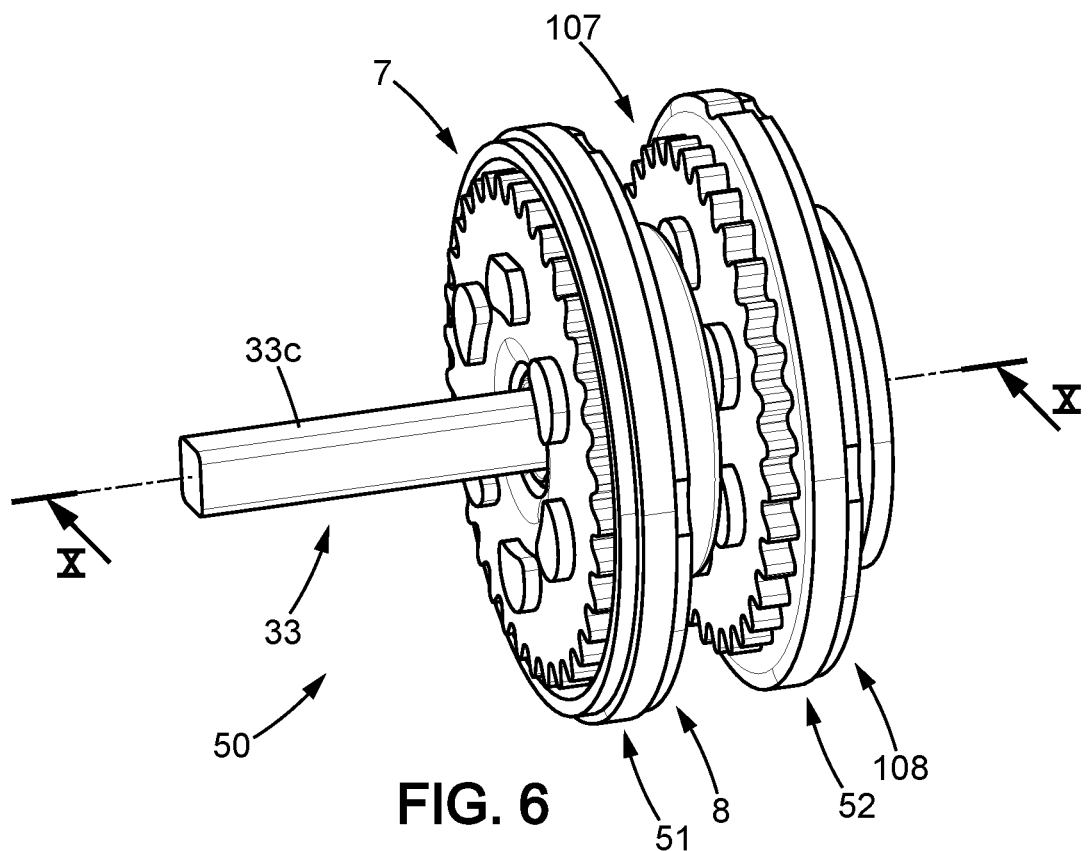
FIG. 6 represents a perspective view of the pivoting system of FIG. 5.
Figure 7:
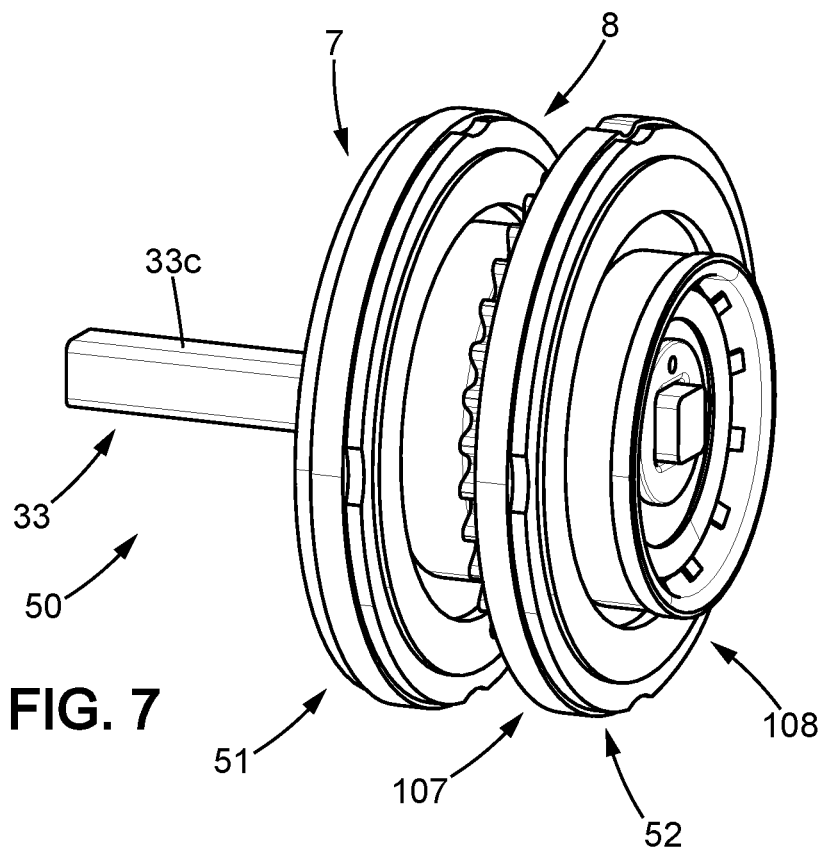
FIG. 7 represents a perspective view of the pivoting system of FIG. 5 from a different angle than that of FIG. 6.
Figure 8:
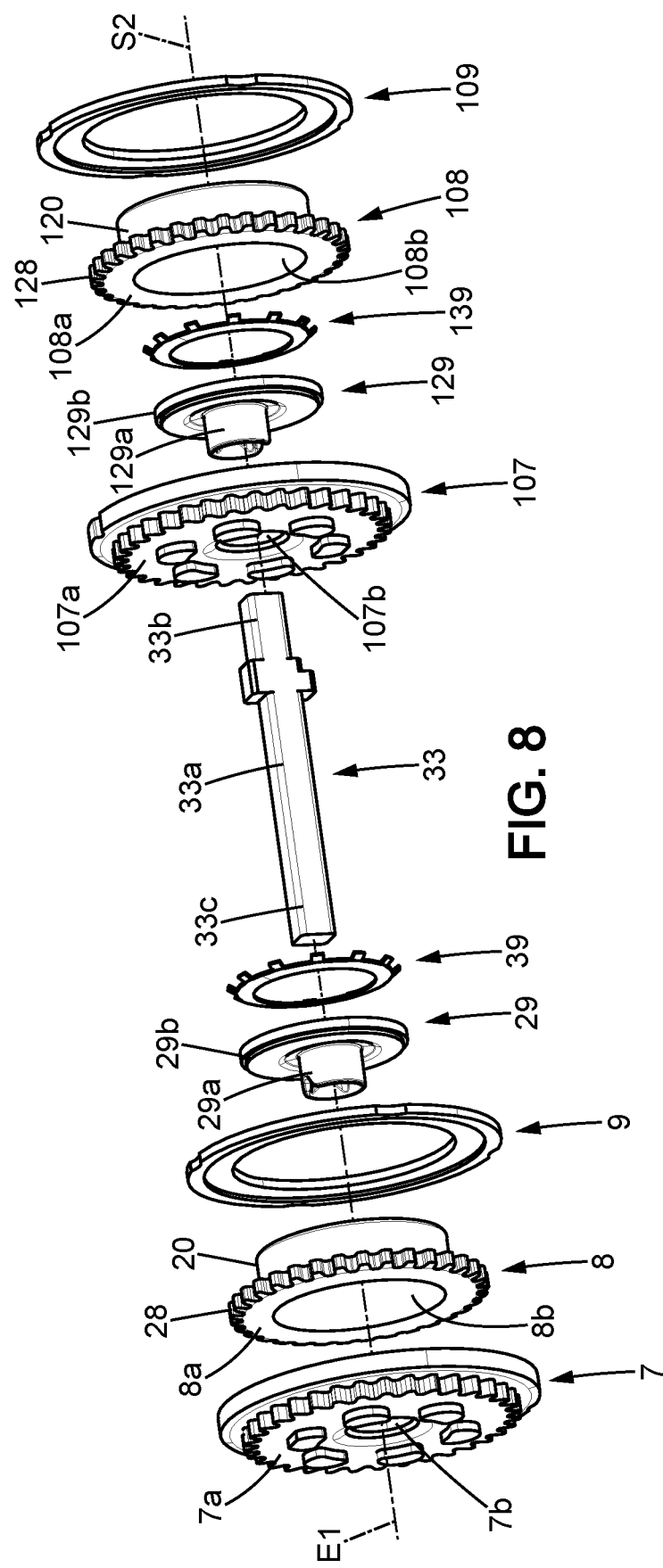
FIG. 8 represents an exploded perspective view of the pivoting system of FIG. 6.
Figure 9:
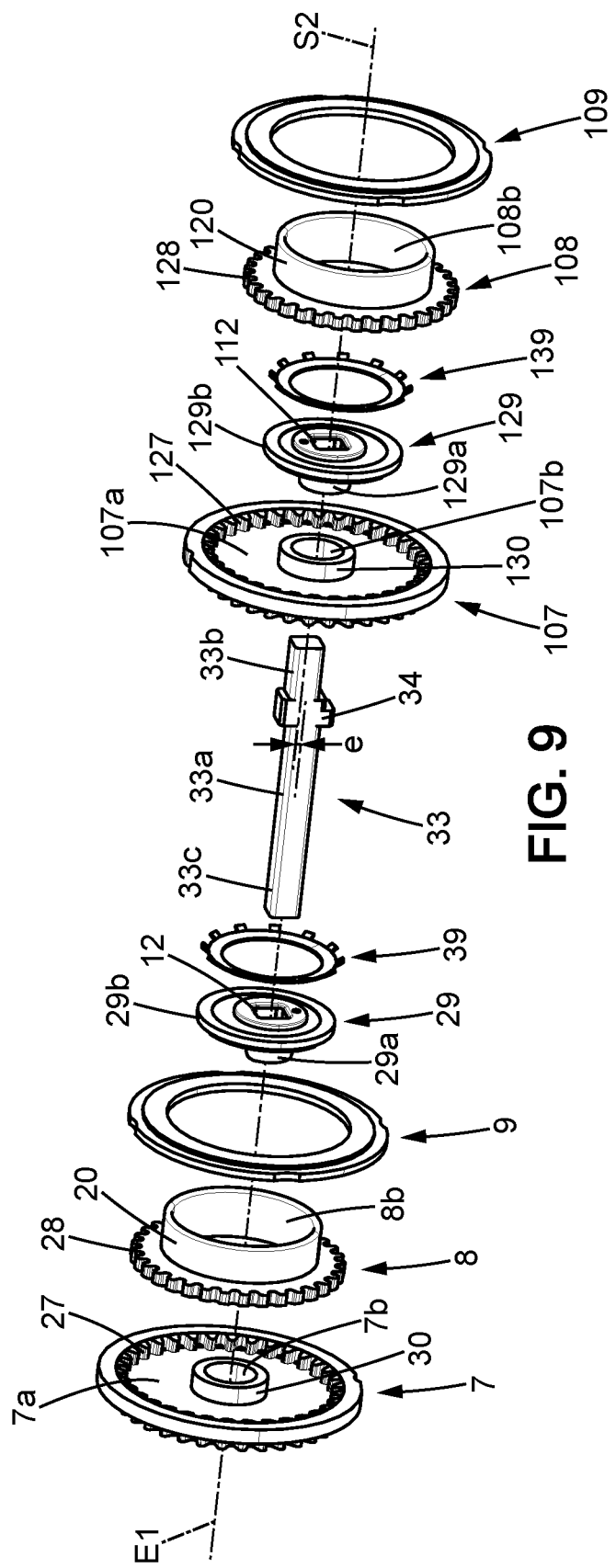
FIG. 9 represents an exploded perspective view of the pivoting system of FIG. 7.
Figure 10:
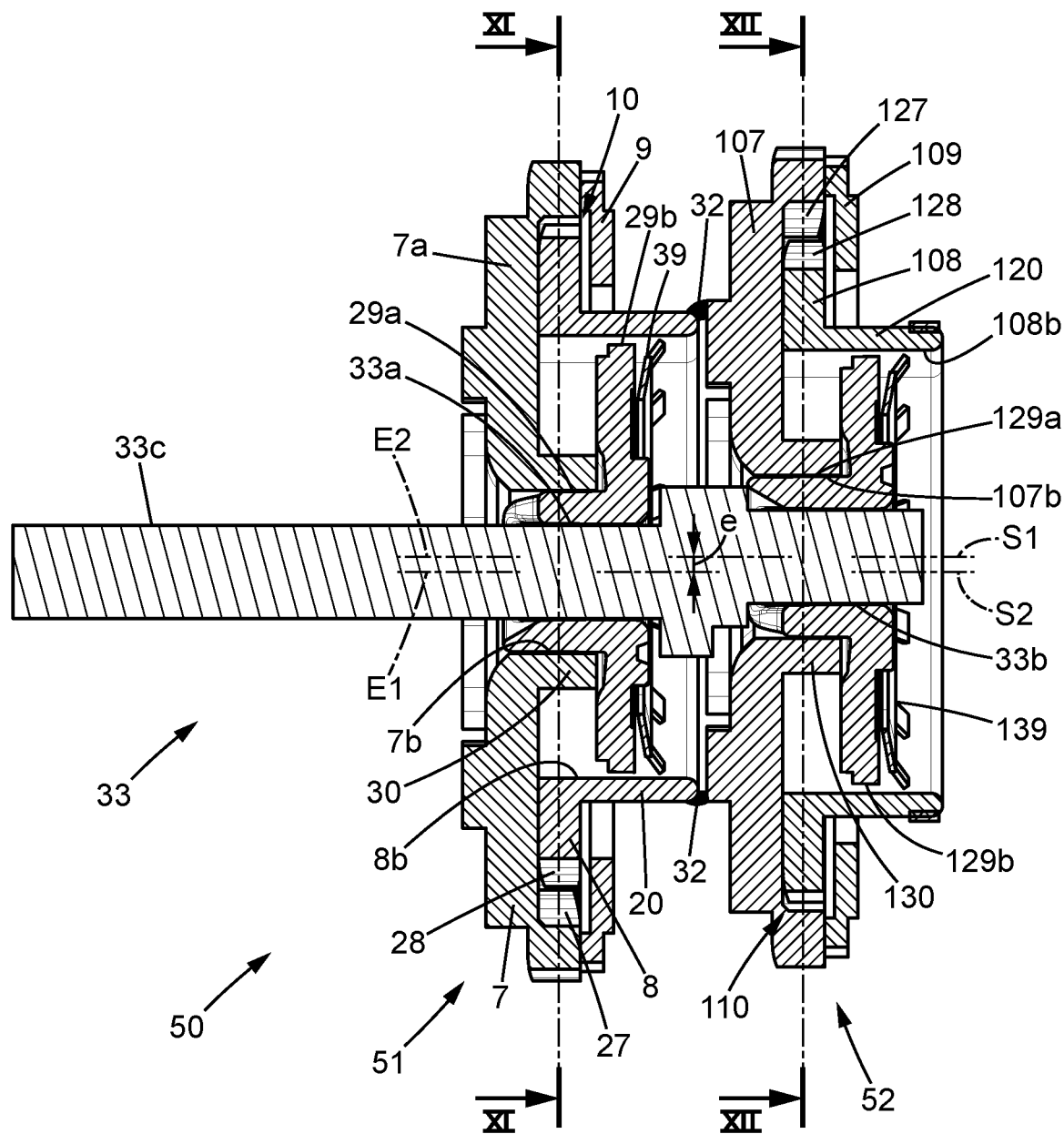
FIG. 10 is an axial section view of the pivoting system along the line labeled X-X in FIG. 6.
Figure 11:
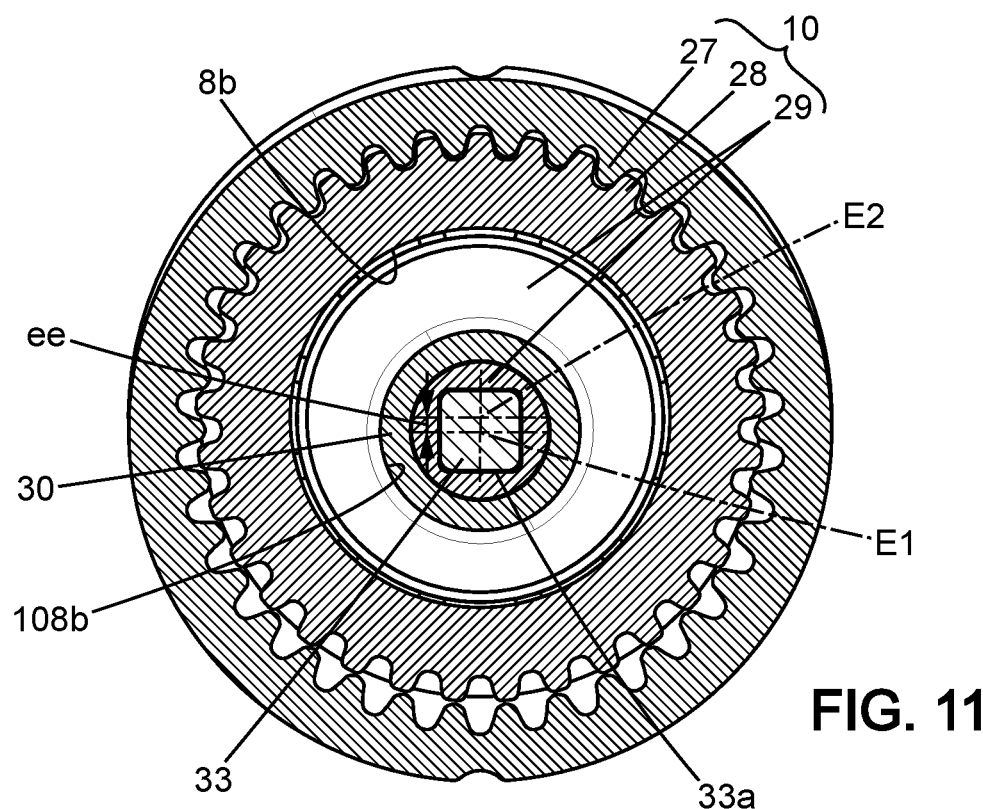
FIG. 11 is a cross-sectional view of the pivoting system along the line labeled XI-XI in FIG. 10.
Figure 12:
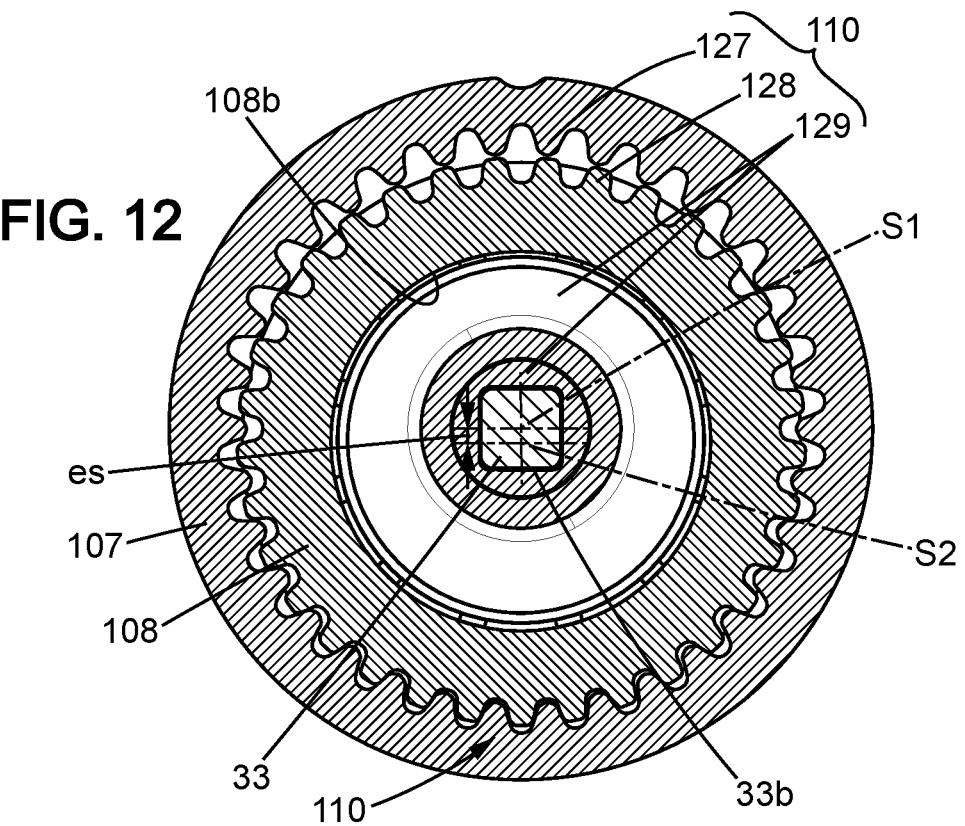
FIG. 12 is a cross-sectional view of the pivoting system along the line labeled XII-XII in FIG. 10.

As illustrated in FIGS. 1 and 5, the tilt of the backrest 2 can be adjusted by means of a pivoting assembly 100. In the illustrated embodiment, the pivoting assembly 100 essentially comprises a control knob 6 or similar, an electric driving device 40, a pivoting system 50, and a control shaft 33. The control knob 6 controls the electric driving device 40, formed by a geared motor in the embodiment illustrated in FIGS. 5 to 12. The geared motor 40 comprises a motor 41 and a reduction gear 42. The geared motor 40 is for example carried by the backrest 2. The geared motor 40 makes it possible to drive the pivoting system 50, of which an embodiment is shown in FIGS. 5 to 12. Alternatively, the electric driving device could be replaced by a manual control lever and the control knob 6 could be eliminated.

Figure 2:
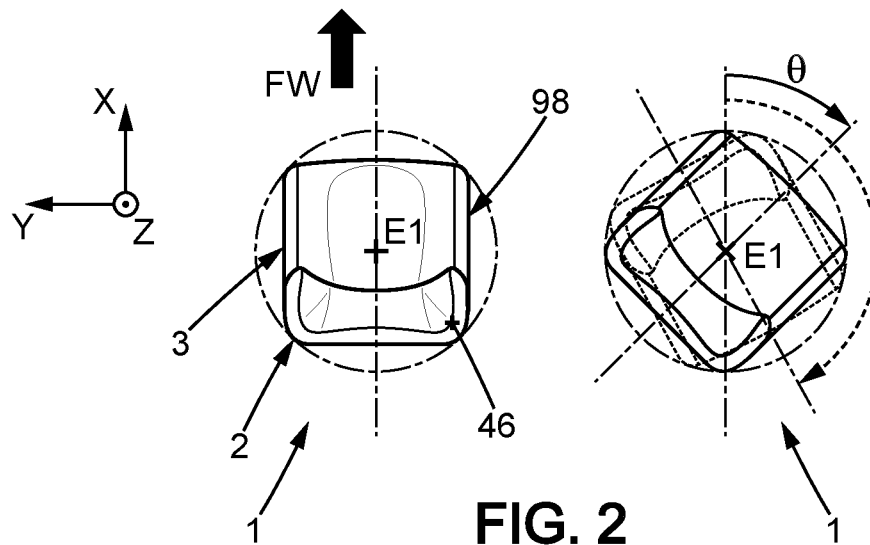
FIG. 2 is a general top view of two vehicle seats, each of the seats comprising a pivoting module equipped with a pivoting assembly according to the present disclosure for pivoting the seat about a vertical axis.
Figure 3:
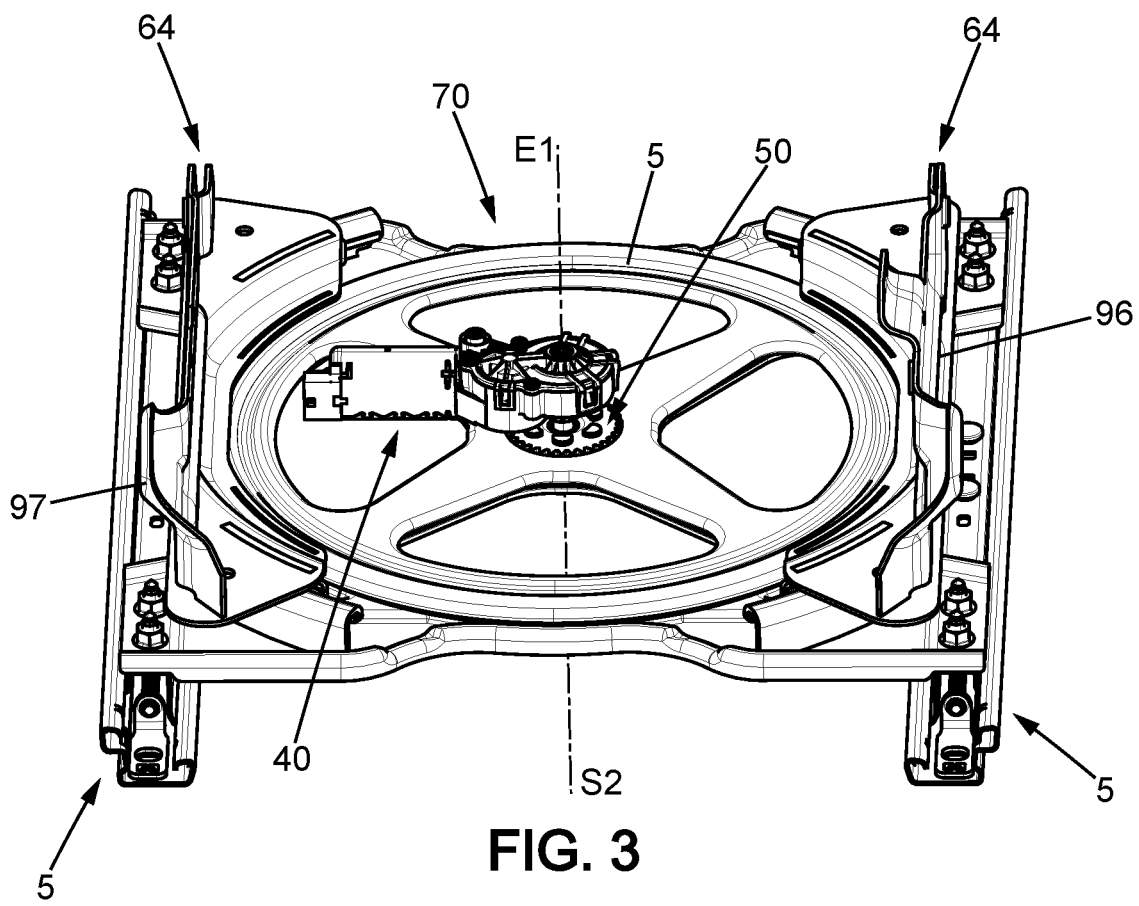
FIG. 3 is a partial perspective view of the pivoting module of FIG. 2.
Figure 4:
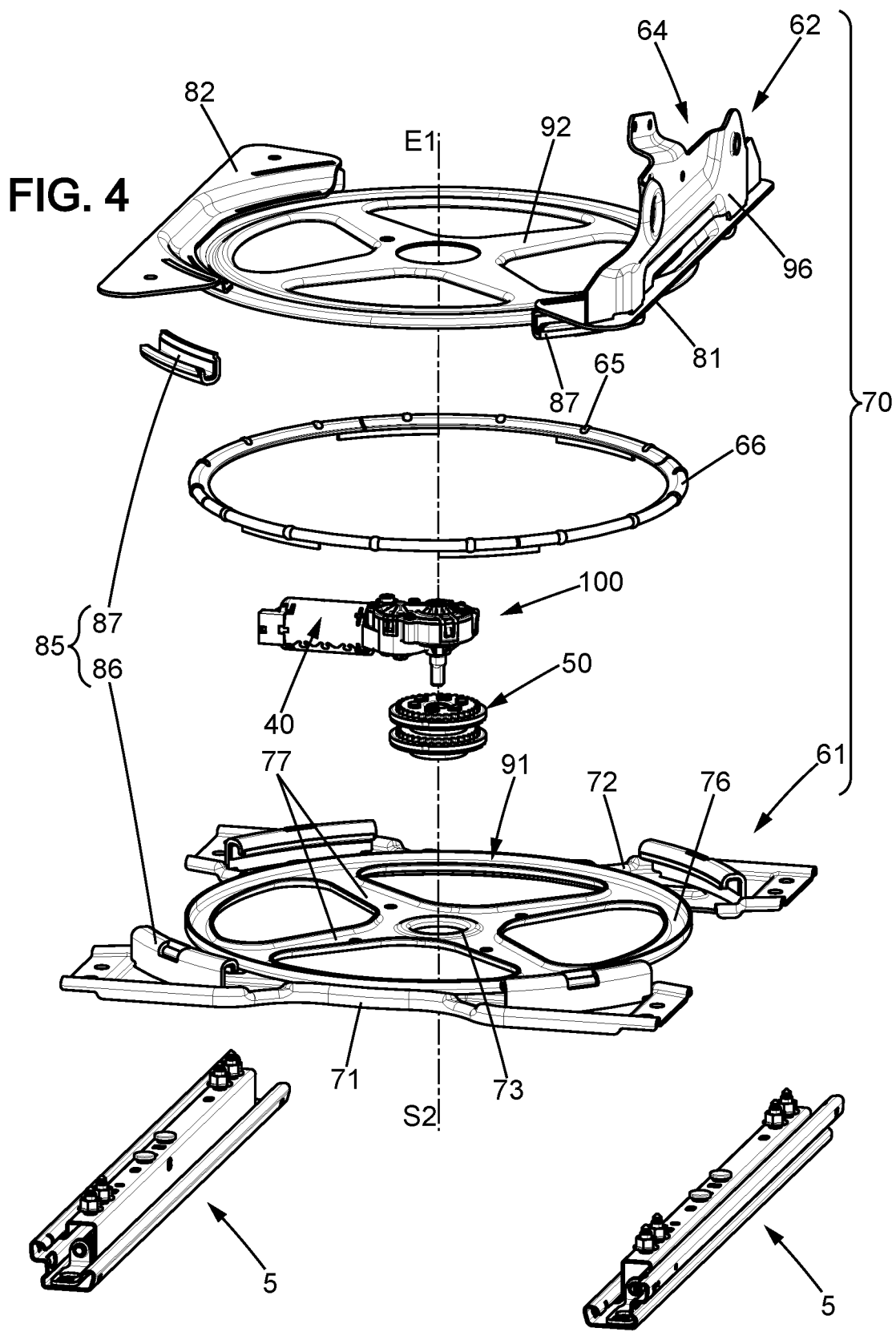
FIG. 4 is a partial exploded perspective view of the pivoting module of FIG. 2.

FIGS. 2 to 4 represent the seat 1, with a pivoting function about the first input axis E1 extending in the vertical direction Z. In the following text, the term "frontward" designates the position of the seat in which the seat is oriented towards the front of the vehicle, in other words a person seated in the seat is oriented/facing towards the front of the vehicle (arrow FW in FIG. 2).

Such a seat 1 with pivoting movement about a vertical axis is desirable in the case where one wishes that the passengers of the vehicle, seated on seats which are normally all oriented in a frontward direction, be able to turn towards each other to discuss, play, or engage in some other activity in a more convivial way.

A pivoting movement about a vertical axis may also be useful in the function of receiving passengers; in this case, the seat is turned towards the exterior of the vehicle unlike in the previous case.

In addition, in the context of more or less advanced autonomous driving situations using self-driving functions of the vehicle, the driver may prefer a seat position which is not directly facing the road.

Varied and very different seat orientations can thus prevail inside the passenger compartment.

In FIG. 2, two seats are represented in a top view, the left one in a conventional position facing strictly forward FW, while several different angular positions are represented for the right one.

The seats 1 are connected to the floor 4 of the vehicle through a pivoting module 70. In the context of the present disclosure, we are interested in forces which may be applied to the top 46 of the backrest 2, in varied and unspecified directions, while remembering to take into account the cases where the vehicle is in an accident (crash resistance).

In the vertical direction Z corresponding to the direction of the pivot axis of the seat 1, each angular position of the seat can be defined by its orientation relative to the forward position FW, using the angle θ. Thus θ=0 represents a seat facing forward, θ=90° represents a seat rotated a quarter turn to the right, θ=180° represents a seat rotated a half turn and facing rearward, θ=270° represents a seat which has rotated three quarters of a turn to the right (or equivalent to a quarter turn to the left). Of course, the seat occupant can adjust the angular position to a plurality of intermediate positions. According to certain variant embodiments, a complete rotation is possible or even several rotations, i.e. a multi-rotation configuration.

In the example illustrated in FIGS. 2 to 4, starting from the floor 4 of the vehicle, the seat 1 comprises the pair of slide rails 5, a base 61 forming the base portion of a pivoting module 70, a rotating ring 62 forming the movable portion of the pivoting module, and a seating portion frame 64 mounted on the rotating ring 62 and forming the bearing structure of the seating portion 3 of the seat 1 on which the backrest 2 of the seat 1 is mounted.

The seating portion frame 64 has a left side flange 96 and a right side flange 97. In FIG. 4, only the left side flange 96 of the seating portion frame is shown.

Mention should be made here of the possibility of a different mounting in an alternative embodiment, namely the pivoting module comprises a base directly fixed to the floor and the longitudinal slide rails are located above the rotating ring of the pivoting module, in other words the longitudinal adjustment slide rails are then riding on the rotating portion and their orientation therefore varies according to the orientation of the vertical pivoting movement.

It should also be noted that it is possible to have a raising movement between the pivoting assembly and the seating portion frame.

The pivoting assembly 100 comprises the pivoting system 50, which is functionally interposed between the base 61 and the rotating ring 62 of the seat 1.

The pivoting system 50 is arranged centrally relative to the base 61 of the seat, in other words the pivoting system 50 is mounted in a central area of the base 61; a second output axis S2 of the pivoting system 50 is in line with the center of the base 61 and extends perpendicularly to the base 61.

The pivoting system 50 enables the rotation of the rotating ring 62 about the first input axis E1 which is coincident or close to the second output axis S2 relative to the base 61. Of course, a reverse mounting is possible, the first input axis E1 being in line with the base 61 and the second output axis S2 being in line with the rotating ring 62. At the same time, the pivoting system 50 prevents any substantial movement within the other degrees of freedom, namely the other two rotations (about the longitudinal direction X and the transverse direction Y) and the three translations within the orthogonal coordinate system (i.e. translation in the longitudinal direction X, translation in the transverse direction Y, and translation in the vertical direction Z).

In the example illustrated, the longitudinal slide rails 5 each comprise a fixed profile integrally connected to the floor 4 and a movable profile which can slide in the longitudinal direction X.

The base 61 is formed as a framework mounted solidly astride the two movable profiles of the longitudinal slide rails 5. For the base 61, this is a framework of folded sheet metal, where appropriate a mechanically welded structure could be provided.

The four corners of the framework may be used for the installation, optional in the meaning of the present disclosure, of a device for additional retention in the event of an accident.

The base 61 may be formed by two crosspieces 71, 72 which extend transversely between the two movable profiles of the longitudinal slide rails 5, and a lower flange 91 integrally fixed to the two crosspieces 71, 72. The lower flange 91 comprises a peripheral rim 76 centered on the second output axis S2, said peripheral rim 76 forming a raceway for roller bearing members 65 which will be discussed below. Furthermore, the lower flange 91 comprises a hub/bearing 73 intended to receive the pivoting system 50. In the example illustrated, the lower flange 91 comprises spokes 77 which connect the central hub 73 to the peripheral rim 76, but of course the lower flange 91 could be solid, have reinforcing ribs, etc. In the example illustrated, the base 61 is made of metal, preferably steel, although the use of light alloy is not excluded. The use of composite materials, in particular fiber-reinforced resins, is also possible for the base 61.

The rotating ring 62 is formed, in the example illustrated here, by an upper flange 92 integrally connected to a left side yoke 81 and a right side yoke 82.

The term "rotating ring" may be understood here in its broadest sense, in other words this term encompasses any structure/framework/plate intended to pivot relative to a base.

A plurality of roller bearing members 65 is provided, interposed between the base 61 and the rotating ring 62. In the example illustrated, balls are used, but it would also be possible to use roller wheels, rollers, or parts of conical shape.

The roller bearing members 65, here in the form of balls, are kept at a distance from one another by a guide cage 66 of annular shape comprising housings for receiving the balls and able to rotate about the first input axis E1 and the second output axis S2. The rotational movement of the cage 66 is half that of the relative movement of the rotating ring 62 with respect to the base 61.

A retention device 85 is provided, comprising a first part 86 secured to the base 61 and a second part 87 secured to the rotating ring 62.

An operating member 98 (see FIG. 2) controls the geared motor 40 in the embodiment illustrated in FIGS. 5 to 12, in order to rotate the seat 1 relative to the floor.

The pivoting system 50 is of the gear type and comprises (see FIGS. 6 to 12) a first hinge mechanism which will be referred to in the following as the input hinge mechanism 51 and a second hinge mechanism which will be referred to in the following as the output hinge mechanism 52.

The input hinge mechanism 51 essentially comprises a first input frame 7, a second input frame 8, and a first hypocycloid gear 10.

The first input frame 7 comprises a first input flange 7a which is of metal and disc-shaped and extends perpendicularly to the first input axis E1. In the examples shown, the first input frame 7 is secured to the frame of the seating portion 3 (in particular by welding or the like) when the pivoting system 50 serves as a backrest hinge, and to the rotating ring 62, more specifically to the upper flange 92, when the pivoting system 50 serves for pivoting the seat about the vertical axis. The first input frame 7 has a first input bore 7b which is cylindrical, rotationally symmetrical and centered on the first input axis E1. The first input bore 7b extends through the first input flange 7a and extends axially within a first input collar 30. The first input collar 30 is rigidly fixed to the first input flange 7a.

The second input frame 8 comprises a second input flange 8a which is of metal and disc-shaped and extends parallel to the first input flange 7a. The second input frame 8 has a second input bore 8b which is cylindrical and rotationally symmetrical and centered on a second input axis E2 parallel to the first input axis E1, but offset from the first input axis E1 by an input eccentricity ee. In the examples shown, the second input axis E2 is offset from the first input axis E1 in the vertical direction Z when the pivoting system 50 is used as a backrest hinge and in the transverse direction Y when the pivoting system 50 is used for pivoting the seat about the vertical axis. The second input bore 8b extends through the second input flange 8a and extends axially within the second input collar 20.

The second input flange 8a is retained against the first input flange 7a, in particular by a metal closure ring 9 welded to the second input frame 8 and surrounding the first input frame 7, in the embodiment illustrated.

The gear 10 connects the first input frame 7 and the second input frame 8. In the illustrated embodiment, the first gear 10 is a single-stage gear which comprises a first input set of teeth 27, a second input set of teeth 28, and a first eccentric cam 29.

The first input set of teeth 27 are circular, centered on the first input axis E1. The first input set of teeth 27 are oriented radially inwards and formed on the inner face of the first input frame 7.

The second input set of teeth 28 are circular, formed at the periphery of the second input flange 8a of the second input frame 8 and oriented radially outwards, these second input set of teeth 28 being centered on the second input axis E2, said first input set of teeth 27 having an inside diameter greater than the outside diameter of the second input set of teeth 28.

Alternatively, the first input set of teeth could be oriented radially outward and formed at the periphery of the first input flange of the first input frame, while the second input set of teeth would be oriented radially inward, said second input set of teeth having an inside diameter greater than the outside diameter of the first input set of teeth.

The first eccentric cam 29 is for example of metal. The first eccentric cam 29 can take various forms. In the example shown, the first eccentric cam 29 comprises a first guide portion 29a, a first drive portion 29b, and a first central recess 12.

The first guide portion 29a is cylindrical and rotationally symmetrical and extends along the first input axis E1. The first guide portion 29a is tightly received in the first input collar 30 and extends opposite the first input bore 7b. The first eccentric cam 29 is therefore guided in rotation about the first input axis E1 by the first input bore 7b of the first input collar 30.

The first drive portion 29b is cylindrical and rotationally symmetrical and centered on the second input axis E2. The first drive portion 29b has an external peripheral surface extending facing the second input bore 8b of the second input collar 20. The first drive portion 29b therefore guides the second input frame 8 in rotation about the second input axis E2.

The first eccentric cam 29 is retained in the direction of the first input axis E1 relative to the first input frame 7 and the second input frame 8, in one direction by abutment against the first input frame 7 and in the opposite direction by abutment on a first retaining part 39 (self-locking ring) braced within the second input bore 8b.

The central recess 12 is cylindrical, centered on the first input axis E1, and has a non-circular cross-section, specifically a square cross-section in the illustrated embodiment. The central recess 12 receives a first drive portion 33a of the control shaft 33.

In another example, the first eccentric cam 29 could be replaced by an eccentric play adjustment cam comprising a rigid ring which has indentations and two wedges forming play adjustment cams with the rigid ring, urged apart by an elastic element, the eccentric cam being actuated by a control member provided with driving fingers tending to bring the wedges together against the biasing of the elastic element, the control member having a central recess. In this case, the first drive portion 33a of the control shaft 33 would preferably be received in the central recess of the control member and the eccentric cam would preferably be guided in rotation, about the first input axis E1, not by the first input bore 7b but by an outer surface of the first input collar 30 that is cylindrical and rotationally symmetrical, thus forming a bearing. The two play adjustment cams functionally formed by the two wedges with the rigid ring also prevent, by jamming due to the action of the elastic element, any relative rotation between the first input frame 7 and the second input frame 8 which is not ordered by the control shaft.

In another example, the first eccentric cam 29 could be replaced by two eccentric play adjustment cams urged apart by an elastic element and actuated by a control member provided with driving fingers tending to bring the eccentricity of the two cams closer together against the biasing of the elastic element, the control member having a central recess. In this case also, the first drive portion 33a of the control shaft 33 would preferably be received in the central recess of the control member and the two eccentric cams would then preferably be guided in rotation, about the first input axis E1, not by the first input bore 7b but by an outer surface of the first input collar 30 that is cylindrical and rotationally symmetrical, thus forming a bearing. The two play adjustment cams according to these exemplary embodiments also prevent any relative rotation between the first input frame 7 and the second input frame 8 which is not commanded by the control shaft.

The control shaft 33 includes the first drive portion 33a, a second drive portion 33b, and a cooperation portion 33c. Preferably, the first drive portion 33a, the second drive portion 33b, and the cooperation portion 33c have a non-circular cross-section: in the illustrated embodiment, it is a substantially square external cross-section.

The first drive portion 33a and the second drive portion 33b have a cylindrical outer surface extending parallel to the direction of the first input axis E1, but the second drive portion 33b is radially offset relative to the first drive portion 33a by an eccentricity e. The second drive portion 33b is centered on the second input axis E2, while the first drive portion 33a is centered on the first input axis E1. Consequently, the eccentricity e of the control shaft 33 is equal to the input eccentricity ee between the second input set of teeth 28 and the first input set of teeth 27.

The cooperation portion 33c extends in the extension of the first drive portion 33a, centered on the first input axis E1. The cooperation portion 33c cooperates with the geared motor 40, in order to drive the control shaft 33 in rotation about the first input axis E1. The reduction gear 42 comprises an output member rotating about the first input axis E1 and connected to the cooperation portion 33 of the control shaft 33, the output member comprising for example a central recess complementary to the cooperation portion 33c.

The control shaft 33 also has a shoulder 34 for positioning it axially, along the direction of the first input axis E1, between the first hinge mechanism 51 and the second hinge mechanism 52.

The first drive portion 33a is tightly received in the central recess 12 of the first eccentric cam 29, the central recess 12 having a shape complementary to the first drive portion 33a. The control shaft 33 passes through the central recess 12, the first drive portion 33a extending between the shoulder 34 and the cooperation portion 33c along the direction of the first input axis E1.

The output hinge mechanism 52 essentially comprises a first output frame 107, a second output frame 108, and a second hypocycloidal gear 110.

The first output frame 107 comprises a first output flange 107a which is disc-shaped and of metal. The first output frame 107 has a first output bore 107b which is cylindrical, rotationally symmetrical and centered on a first output axis S1, the first output flange 107a extending perpendicularly to the first output axis S1. In the example shown, the first output frame 107 is integrally secured such that the first output axis S1 corresponds to the second input axis E2, in other words such that the first output bore 107b is coaxial with the second input bore 8b, in the illustrated embodiment. The first output frame 107 is rigidly fixed to the second input frame 8, in particular by welding 32, clamping, bolting, or the like. The first output bore 107b extends through the first output flange 107a and extends axially within a first output collar 130. The first output collar 130 is rigidly fixed to the first output flange 107a.

The second output frame 108 comprises a second output flange 108a which is disc-shaped and of metal and extends parallel to the first output flange 107a. In the examples shown, the second output flange 108 is integrally secured (in particular by welding or the like) to the frame of the backrest 2 when the pivoting system 50 serves as a backrest hinge, and to the base 61, more specifically to the lower flange 91, when the pivoting system 50 is used for the vertical axis pivoting of the seat. The second output frame 108 has a second output bore 108b which is cylindrical, rotationally symmetrical and centered on the second output axis S2 parallel to the first output axis S1, but offset from the first output axis S1 by an output eccentricity es. In the examples shown, the second output axis S2 is offset from the first input axis E1 in the vertical direction Z when the pivoting system 50 serves as a backrest hinge and in the transverse direction Y when the pivoting system 50 is used for the vertical axis pivoting of the seat. In the illustrated embodiments, at each instant the input eccentricity ee, the output eccentricity es, and the eccentricity e of the control shaft 33 are in the same plane, consisting of the plane of FIG. 10 in the position illustrated. The absolute value of the output eccentricity es is equal in value to the input eccentricity ee, the output eccentricity es extends along the same direction as the input eccentricity ee, but the output eccentricity is opposite to the input eccentricity, such that the second output axis S2 corresponds to the first input axis E1. In practice, the output hinge mechanism 52 corresponds to the input hinge mechanism 51 pivoted by 180 degrees about the first input axis E1 (and moved translationally along the first input axis E1). The second output bore 108b extends through the second output flange 108a and extends axially within the second output collar 120.

The second output flange 108a is retained against the first output flange 107a, in particular by a metal closure ring 109 welded to the second output frame 108 and surrounding the first output frame 107, in the embodiment illustrated.

The second gear 110 connects the first output frame 107 and the second output frame 108. In the illustrated embodiment, the second gear 110 is a single-stage gear which comprises a first output set of teeth 127, a second output set of teeth 128, and a second eccentric cam 129.

The first output set of teeth 127 are circular, centered on the first output axis S1. The first output set of teeth 127 are oriented radially inwards and formed on the inner face of the first output frame 107.

The second output set of teeth 128 are circular, formed at the periphery of the second output flange 108a of the second output frame 108 and oriented radially outwards, these second output set of teeth 128 being centered on the second output axis S2, said first output set of teeth 127 having an inside diameter greater than the outside diameter of the second output set of teeth 128.

Alternatively, the first output set of teeth could be oriented radially outward and formed at the periphery of the first output flange of the first output frame, while the second output set of teeth would be oriented radially inward, said second output set of teeth having an inside diameter greater than the outside diameter of the first output set of teeth.

The second eccentric cam 129 is for example of metal. The second eccentric cam 129 can take various forms. In the example shown, the second eccentric cam 129 comprises a second guide portion 129a, a second drive portion 129b, and a second central recess 112.

The second guide portion 129a is cylindrical and rotationally symmetrical and extends along the first output axis S1. The second guide portion 129a is tightly received in the first output collar 130 and extends opposite the first output bore 107b. The second eccentric cam 129 is therefore guided in rotation about the first output axis S1 by the first output bore 107b of the first output collar 130.

The second drive portion 129b is cylindrical and rotationally symmetrical and centered on the second output axis S2. The second drive portion 129b has an external peripheral surface extending facing the second output bore 108b of the second output collar 120. The second drive portion 129b therefore guides the second output frame 108 in rotation about the second output axis S2.

The second central recess 112 is cylindrical, centered on the first output axis S1, and has a non-circular cross-section, specifically a square cross-section in the illustrated embodiment. The second central recess 112 receives the second drive portion 33b of the control shaft 33.

The second eccentric cam 129 is retained in the direction of the first output axis S1 relative to the first output frame 107 and the second output frame 108, in one direction by abutment against the first output frame 107 and in the opposite direction by abutment on a second retaining part 139 (self-locking ring) braced within the second output bore 108b.

In another example, the second eccentric cam 129 could be replaced by an eccentric play adjustment cam comprising a rigid ring which has indentations and two wedges forming play adjustment cams with the rigid ring, urged apart by an elastic element, the eccentric cam being actuated by a control member provided with driving fingers tending to bring the wedges together against the biasing of the elastic element, the control member having a central recess. In this case, the second drive portion 33b of the control shaft 33 would preferably be received in the central recess of the control member and the eccentric cam would preferably be guided in rotation, about the first output axis S1, not by the first output bore 107b but by an outer surface of the first output collar 130 that is cylindrical and rotationally symmetrical, thus forming a bearing. The two play adjustment cams functionally formed by the two wedges with the rigid ring also prevent, by jamming due to the action of the elastic element, any relative rotation between the first output frame 107 and the second output frame 108 which is not ordered by the control shaft.

In another example, the second eccentric cam 129 could be replaced by two eccentric play adjustment cams urged apart by an elastic element and actuated by a control member provided with driving fingers tending to bring the eccentricity of the two cams closer together against the biasing of the elastic element, the control member having a central recess. In this case also, the second drive portion 33b of the control shaft 33 would preferably be received in the central recess of the control member and the two eccentric cams would then preferably be guided in rotation, about the first output axis S1, not by the first output bore 107b but by an outer surface of the first output collar 130 that is cylindrical and rotationally symmetrical, thus forming a bearing. The two play adjustment cams according to these exemplary embodiments also prevent any relative rotation between the first output frame 107 and the second output frame 108 which is not commanded by the control shaft.

More generally, as a variant, the input hinge mechanism 51 and/or the second hinge mechanism 52 could be replaced by any other suitable hinge mechanisms.

Depending on the hinge mechanism used for the input hinge mechanism 51 and for the output hinge mechanism 52, the control shaft 33 may have different configurations, in particular the control shaft may have no eccentricity e between the first drive portion 33a and the second drive portion 33b.

In the illustrated embodiment, the first input set of teeth 27 includes 34 teeth and the second input set of teeth 28 includes 33 teeth. As a result, by considering the first input frame 7 as fixed, the reduction ratio between the rotation of the control shaft 33 about the first input axis E1 and the second input frame 8 about the second axis of input E2 is 1/34. As a result, when the geared motor 40 completes one revolution about the first input axis E1, the control shaft 33 rotates the first eccentric cam 29 via the first drive portion 33a, and the second input frame 8 and the first output frame 107 are rotated about the second input axis E2 by 1/34$^{th}$ of a turn.

The first output set of teeth 127 includes 34 teeth and the second output set of teeth 128 includes 33 teeth. As the control shaft 33 drives not only the first eccentric cam 29 via the first drive portion 33a, but also the second eccentric cam 129 via the second drive portion 33b, the reduction ratio between the rotation of the control shaft 33 about the first input axis E1 and the second output frame 108 about the second output axis S2 (in other words about the first input axis E1) would be 1/34. In actuality, as indicated above, because the control shaft 33 rotates the first output frame 107, when the control shaft 33 completes one revolution relative to the first input frame 7, the control shaft does not complete exactly one revolution (33/34$^{th}$ of a revolution in the illustrated embodiment, but it could be 35/34$^{th}$ of a revolution in other embodiments) relative to the first output frame 107, such that the second output frame 108 completes slightly less than 1/34$^{th}$ of a revolution compared to the first output frame 107.

As a result, the second output frame 108 completes 1/34$^{th}$+1/34$^{th}$ (more precisely 1/34+1/34×33/34) of a revolution about the first input axis E1 when the control shaft 33 completes one revolution about the first input axis E1. As a result, in the illustrated embodiment, the pivoting assembly 100 makes it possible to pivot the backrest 2 relative to the seating portion 3 (when the pivoting system 50 serves as a backrest hinge) and the seat relative to the floor (when the pivoting system 50 is used for the vertical axis pivoting of the seat) in rotation about the axis of rotation as output of the geared motor 42, in other words about the first input axis E1, without parasitic nutation movement with a reduction ratio of substantially 1/17 (with reversal of the direction of rotation).

As the reduction ratio of the pivoting system 50 is two times less than the reduction ratio of each among the first hinge mechanism 51 and the second hinge mechanism 52, this also makes it possible to use a motor 41 which rotates more slowly and provides higher torque than when using only one among the first hinge mechanism 51 and the second hinge mechanism 52.

The present disclosure relates to pivoting systems and to vehicle seats comprising such systems. Such pivoting systems may in particular be used to maintain and adjust the orientation of the backrest relative to the seating portion and to rotate the entire seat relative to the vehicle floor.

The present disclosure relates more particularly to a pivoting system comprising:

a hinge mechanism comprising a first frame and a second frame mounted so as to rotate relative to one another and connected together by a hypocycloidal gear, the gear comprising an eccentric cam, a first set of teeth and a second set of teeth, the first set of teeth and second set of teeth being circular and in mutual engagement, the first set of teeth being mechanically linked to the first frame and the second set of teeth being mechanically linked to the second frame, the first set of teeth being centered on a first axis and the second set of teeth being centered on a second axis, the eccentric cam having an eccentricity corresponding to the distance between the first axis and the second axis, and a control shaft comprising a drive portion capable of rotating the eccentric cam.

In one comparative pivoting system of this type, such a pivoting system, of the single-stage hinge type, is particularly robust, enables the transmission of high torques, is irreversible, provides high impact resistance, and it is without backlash, which in particular gives the user a sense of quality.

However, the second frame follows a nutational movement relative to the first frame. This comparative pivoting system implies in particular that the backrest does not rotate about a fixed axis of rotation relative to the seating portion when the first frame and the second frame are fixed one to a seating portion and the other to a backrest, or that the seat does not rotate about a fixed axis of rotation relative to the floor when the first frame and the second frame are fixed one to the floor and the other to the seat. Although slight, it may be desirable to reduce this parasitic movement to make it completely imperceptible or even to eliminate it.

Furthermore, another comparative pivoting system of the reduction gear type with a hypocycloidal gear train lacks such a parasitic movement. Such a comparative pivoting system comprises a first flange provided with a first circular toothed ring, a second flange provided with a second circular toothed ring, and a double satellite comprising two circular ring gears integral with one another, the double satellite being driven by a single control cam to cause a rotational movement between the first flange and the second flange, one of the ring gears being engaged with the first toothed ring and the other gear of the double satellite being engaged with the second toothed ring.

However, a comparative hypocycloidal hinge type of pivoting system with satellite has the disadvantage of having multiple backlashes (due to manufacturing tolerances) which cannot be compensated for. It is possible to soften the effect of such backlashes by providing braking elements causing friction. However, not only are the undesirable effects of these backlashes not completely avoided, but this comparative pivoting system has other drawbacks, such as insufficient irreversibility to provide resistance to stresses in the event of an impact to ensure a satisfactory level of safety.

According to the present disclosure, a pivoting system comprises:

a first hinge mechanism comprising a first frame and a second frame mounted so as to rotate relative to one another and connected together by a first hypocycloidal gear, the first gear comprising a first eccentric cam, a first set of teeth and a second set of teeth, the first set of teeth of the first hinge mechanism and the second set of teeth of the first hinge mechanism being circular and in mutual engagement, the first set of teeth of the first hinge mechanism being mechanically linked to the first frame of the first hinge mechanism and the second set of teeth of the first hinge mechanism being mechanically linked to the second frame of the first hinge mechanism, the first set of teeth of the first hinge mechanism being centered on a first axis and the second set of teeth of the first hinge mechanism being centered on a second axis, the first eccentric cam having a first eccentricity corresponding to the distance between the first axis and the second axis, a second hinge mechanism comprising a first frame and a second frame mounted so as to rotate relative to one another and connected together by a second hypocycloidal gear, the second gear comprising a second eccentric cam, a first set of teeth and a second set of teeth, the first set of teeth of the second hinge mechanism and the second set of teeth of the second hinge mechanism being circular and in mutual engagement, the first set of teeth of the second hinge mechanism being mechanically linked to the first frame of the second hinge mechanism and the second set of teeth of the second hinge mechanism being mechanically linked to the second frame of the second hinge mechanism, the first set of teeth of the second hinge mechanism being centered on a third axis and the second set of teeth of the second hinge mechanism being centered on a fourth axis, the second eccentric cam having a second eccentricity corresponding to the distance between the third axis and the fourth axis, the second frame of the first hinge mechanism being rigidly fixed to the first frame of the second hinge mechanism and the third axis being coaxial with the second axis, the first eccentricity being equal to the second eccentricity, such that the fourth axis is substantially coaxial with the first axis, and a control shaft comprising a first drive portion configured to drive the first eccentric cam in rotation and a second drive portion configured to drive the second eccentric cam in rotation.

The disadvantages mentioned above concerning comparative hinge systems are thus avoided. In addition, in the case of pivoting the seat relative to the vehicle floor, this allows the use of a bearing device between the seat and the floor without the bearing device having to undergo unwanted movement between the two parts in contact with the bearing elements or the simplification of the guidance system of the two parts in contact with the bearing elements. In addition, the reduction ratio of the pivoting system is less than the reduction ratio of each among the first hinge mechanism and second hinge mechanism, such that the present disclosure enables using a motor which rotates more slowly and provides higher torque than when using only one among the first hinge mechanism and second hinge mechanism.

In various embodiments of the pivoting system according to the present disclosure, one can optionally have recourse to one or more of the following arrangements:

the control shaft has an eccentricity between the first drive portion and the second drive portion which is equal to the first eccentricity of the first hinge mechanism and to the second eccentricity of the second hinge mechanism;

the first set of teeth of the first hinge mechanism surrounds the second set of teeth of the first hinge mechanism, and the first set of teeth of the second hinge mechanism surrounds the second set of teeth of the second hinge mechanism;

the first eccentric cam comprises first radial play adjustment cams and the second eccentric cam comprises second radial play adjustment cams;

the first frame of the first hinge mechanism comprises a first collar, cylindrical, rotationally symmetrical and centered on the first axis, and the second frame of the first hinge mechanism comprises a second collar, cylindrical, rotationally symmetrical and centered on the second axis;

the first collar of the first hinge mechanism has a bore centered on the first axis, and the first eccentric cam has a guide surface guided in rotation about the first axis within the bore of the first collar of the first hinge mechanism;

the second collar of the first hinge mechanism has a bore centered on the second axis, and the first eccentric cam has a drive surface around which the bore of the second collar of the first hinge mechanism is guided in rotation on the second axis;

the first frame of the second hinge mechanism comprises a first collar, cylindrical, rotationally symmetrical, centered on the second axis, and the second frame of the second hinge mechanism comprises a second collar, cylindrical, rotationally symmetrical and centered on the first axis;

the first collar of the second hinge mechanism has a bore centered on the second axis, and the second eccentric cam has a guide surface guided in rotation about the second axis within the bore of the first collar of the second hinge mechanism;

the second collar of the second hinge mechanism has a bore centered on the first axis, and the second eccentric cam has a drive surface around which the bore of the second collar of the second hinge mechanism is guided in rotation on the first axis;

the first set of teeth of the first hinge mechanism has the same number of teeth as the first set of teeth of the second hinge mechanism, and the second set of teeth of the first hinge mechanism has the same number of teeth as the second set of teeth of the second hinge mechanism;

the first hinge mechanism is identical to the second hinge mechanism, but angularly offset by 180 degrees about the first axis.

The present disclosure also relates to a pivoting assembly. Preferably, the pivoting assembly comprises the aforementioned pivoting system and a motor connected to a cooperation portion of the control shaft.

The present disclosure further relates to a seat. In one example, the seat comprises a first portion, a second portion, and the aforementioned pivoting system or the aforementioned pivoting assembly, the first portion being connected to the second portion by the pivoting system, the first frame of the first hinge mechanism being fixed to the first portion of the seat and the second frame of the second hinge mechanism being connected to the second portion of the seat.

In one example, the first portion of the seat is a seating portion and the second portion of the seat is a backrest.

In another example, the first portion of the seat is a seating portion and the second portion of the seat is intended to be fixed to a vehicle floor.

The present disclosure further relates to a pivoting module comprising the aforementioned pivoting system or the aforementioned pivoting assembly arranged between a seat and a vehicle floor, the pivoting system being arranged between a seat and a vehicle floor in order to pivot the seat relative to the floor about a substantially vertical axis.

The invention claimed is:

1. A pivoting system comprising:
a first hinge mechanism comprising a first frame and a second frame mounted so as to rotate relative to one another and connected together by a first hypocycloidal gear, the first gear comprising a first eccentric cam, a first set of teeth and a second set of teeth, the first set of teeth of the first hinge mechanism and the second set of teeth of the first hinge mechanism being circular and in mutual engagement, the first set of teeth of the first hinge mechanism being mechanically linked to the first frame of the first hinge mechanism and the second set of teeth of the first hinge mechanism being mechanically linked to the second frame of the first hinge mechanism, the first set of teeth of the first hinge mechanism being centered on a first axis and the second set of teeth of the first hinge mechanism being centered on a second axis, the first eccentric cam having a first eccentricity corresponding to the distance between the first axis and the second axis,
a control shaft comprising a first drive portion configured to drive the first eccentric cam in rotation,
a second hinge mechanism comprising a first frame and a second frame mounted so as to rotate relative to one another and connected together by a second hypocycloidal gear, the second gear comprising a second eccentric cam, a first set of teeth and a second set of teeth, the first set of teeth of the second hinge mechanism and the second set of teeth of the second hinge mechanism being circular and in mutual engagement, the first set of teeth of the second hinge mechanism being mechanically linked to the first frame of the second hinge mechanism and the second set of teeth of the second hinge mechanism being mechanically linked to the second frame of the second hinge mechanism, the first set of teeth of the second hinge mechanism being centered on a third axis and the second set of teeth of the second hinge mechanism being centered on a fourth axis, the second eccentric cam having a second eccentricity corresponding to the distance between the third axis and the fourth axis, wherein the second frame of the first hinge mechanism is rigidly fixed to the first frame of the second hinge mechanism and the third axis is coaxial with the second axis, wherein the first eccentricity is equal to the second eccentricity, such that the fourth axis is substantially coaxial with the first axis, and wherein the control shaft comprises a second drive portion configured to drive the second eccentric cam in rotation.

2. The pivoting system of claim 1, wherein the control shaft has an eccentricity between the first drive portion and the second drive portion which is equal to the first eccentricity of the first hinge mechanism and to the second eccentricity of the second hinge mechanism.

3. The pivoting system of claim 1, wherein the first set of teeth of the first hinge mechanism surrounds the second set of teeth of the first hinge mechanism, and the first set of teeth of the second hinge mechanism surrounds the second set of teeth of the second hinge mechanism.

4. The pivoting system of claim 1, wherein the first eccentric cam comprises first radial play adjustment cams and the second eccentric cam comprises second radial play adjustment cams.

5. The pivoting system of claim 1, wherein the first frame of the first hinge mechanism comprises a first collar, cylindrical, rotationally symmetrical, centered on the first axis, and the second frame of the first hinge mechanism comprises a second collar, cylindrical, rotationally symmetrical, centered on the second axis.

6. The pivoting system of claim 1, wherein the first set of teeth of the first hinge mechanism has the same number of teeth as the first set of teeth of the second hinge mechanism, and the second set of teeth of the first hinge mechanism has the same number of teeth as the second set of teeth of the second hinge mechanism.

7. The pivoting system of claim 6, wherein the first hinge mechanism is identical to the second hinge mechanism, but angularly offset by 180 degrees.

8. The pivoting system of claim 1, further comprising a motor connected to a cooperation portion of the control shaft.

9. A seat comprising a first portion, a second portion, and the pivoting system according to claim 1, wherein the first portion is connected to the second portion by the pivoting system, the first frame of the first hinge mechanism being fixed to the first portion of the seat and the second frame of the second hinge mechanism being connected to the second portion of the seat.

10. A seat comprising a first portion, a second portion, the pivoting system according to claim 8, wherein the first portion is connected to the second portion by the pivoting system, the first frame of the first hinge mechanism being fixed to the first portion of the seat and the second frame of the second hinge mechanism being connected to the second portion of the seat.

11. A pivoting module comprising the pivoting system according to claim 1, the pivoting system being arranged between a seat and a floor of a vehicle in order to pivot the seat relative to the floor about a substantially vertical axis.

12. A pivoting module comprising the pivoting system according to claim 8, the pivoting system being arranged between a seat and a floor of a vehicle in order to pivot the seat relative to the floor about a substantially vertical axis.

* * * * *